United States Patent [19]

Stoub et al.

[11] Patent Number: 4,780,823

[45] Date of Patent: Oct. 25, 1988

[54] MULTIPLE PIXEL AREA-WEIGHTED ACQUISITION SYSTEM FOR SCINTILLATION CAMERAS

[75] Inventors: Everett W. Stoub, Dunwoody, Ga.; Raymond P. DeVito, Palatine; Anthony Del Medico, Niles, both of Ill.

[73] Assignee: Siemens Gammasonics, Inc., Des Plaines, Ill.

[21] Appl. No.: 838,509

[22] Filed: Mar. 11, 1986

[51] Int. Cl.⁴ ................................................ G01T 1/20
[52] U.S. Cl. ............................ 364/413.13; 250/363.5
[58] Field of Search ............ 250/324, 325, 326, 328, 250/358.1, 359.1, 360.1, 363 S, 366, 368, 369, 363 R; 364/414

[56] References Cited

U.S. PATENT DOCUMENTS

| 3,878,373 | 4/1975 | Blum | 235/151.3 |
| 3,996,467 | 12/1976 | Froggatt | 250/366 |
| 4,274,002 | 6/1981 | Tomita | 250/369 |
| 4,429,226 | 1/1984 | Inbar | 350/369 |
| 4,475,042 | 10/1984 | Arsencau | 250/369 |
| 4,654,795 | 3/1987 | Shimoni | 364/414 |

FOREIGN PATENT DOCUMENTS 0125403 11/1984 European Pat. Off. .
60118980 11/1983 Japan .
1283915 8/1972 United Kingdom .

Primary Examiner—Michael R. Fleming
Attorney, Agent, or Firm—Mark H. Jay

[57] ABSTRACT

Upon the detection of a scintillation event at an event pixel, a plurality of associated pixels are identified. Weights are assigned to the event pixel and to all of the associated pixels in such a manner as to attribute the event over an area in a statistically accurate manner. A current sum of all weights which have been previously assigned to each pixel is stored. Unblank signals are generated, based upon this current sum, and the current sum is updated to account for the number of unblank signals so generated.

9 Claims, 11 Drawing Sheets

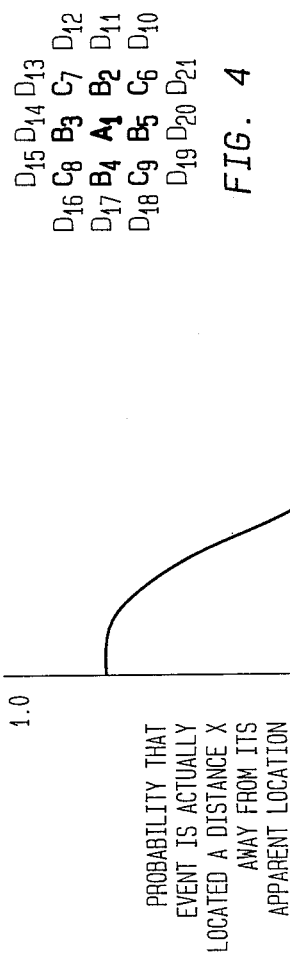
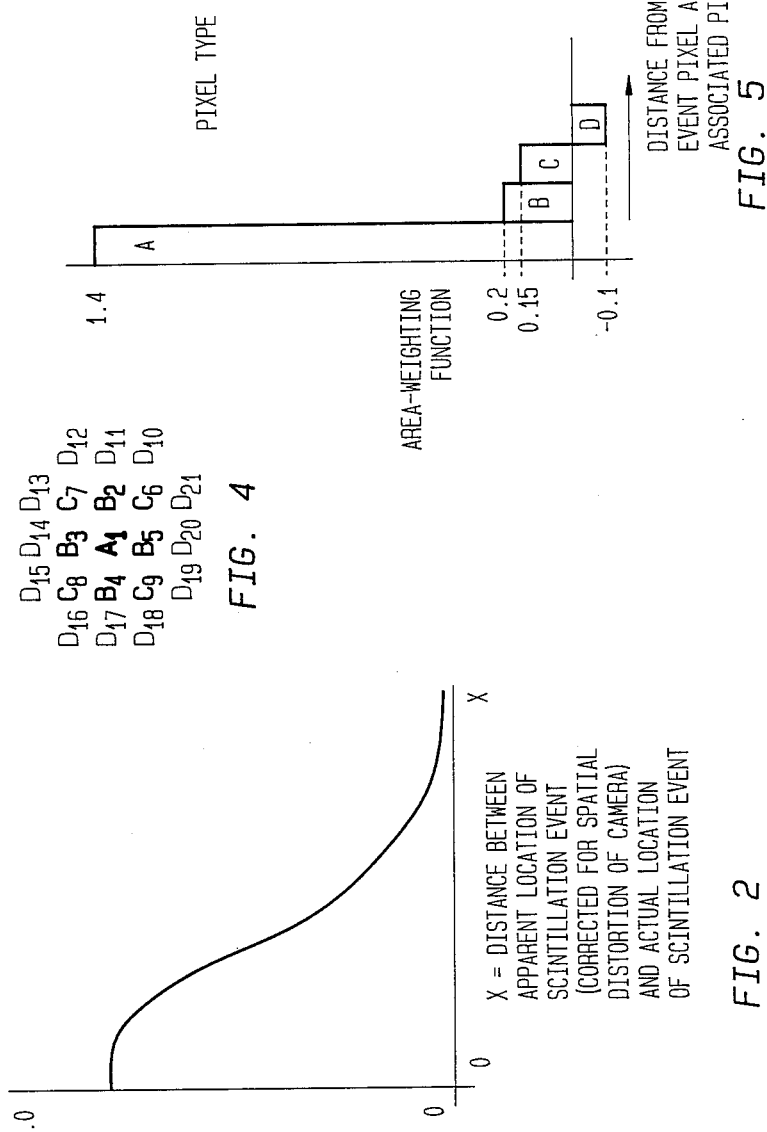
FIG. 4
FIG. 5
FIG. 2

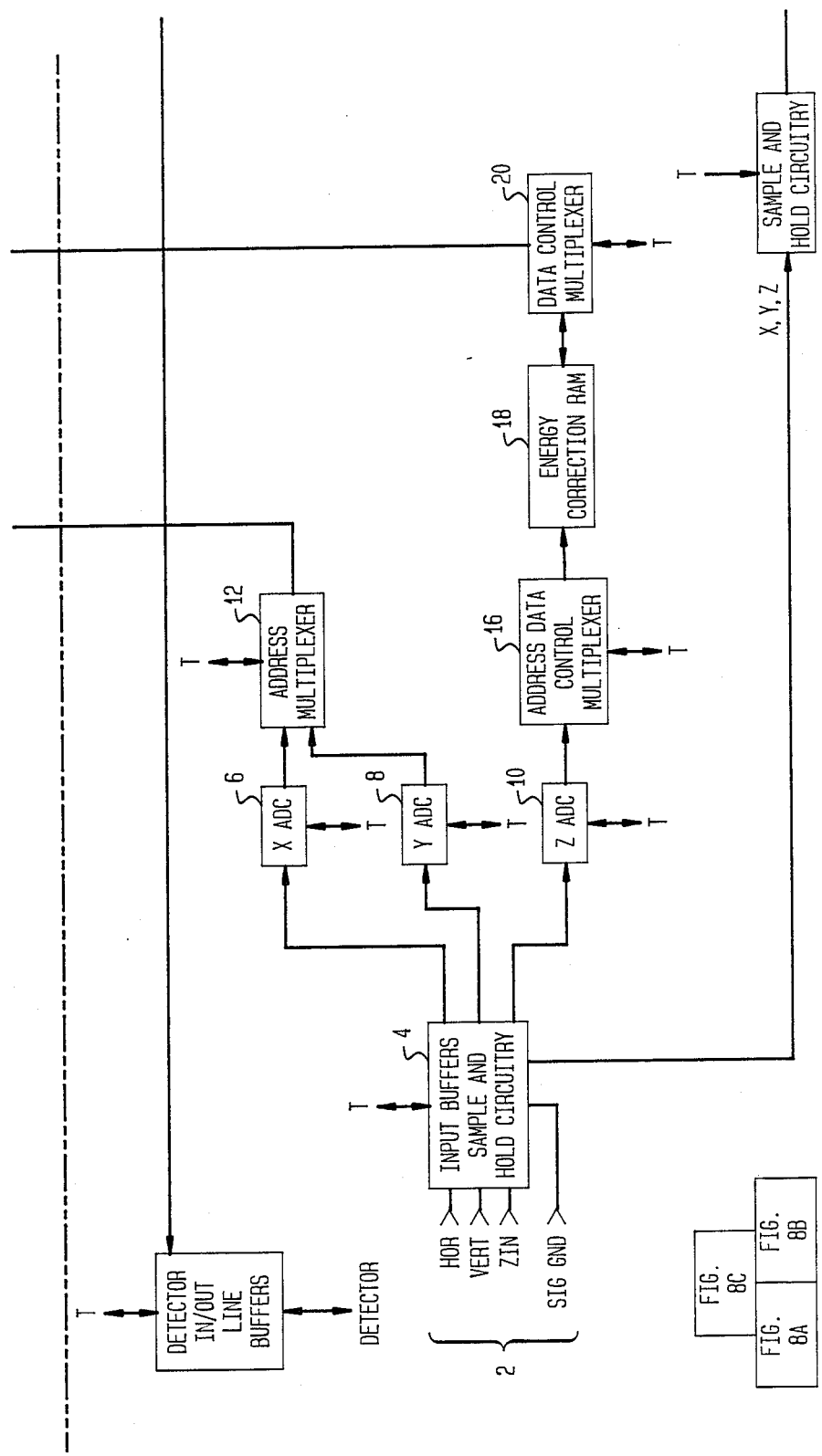

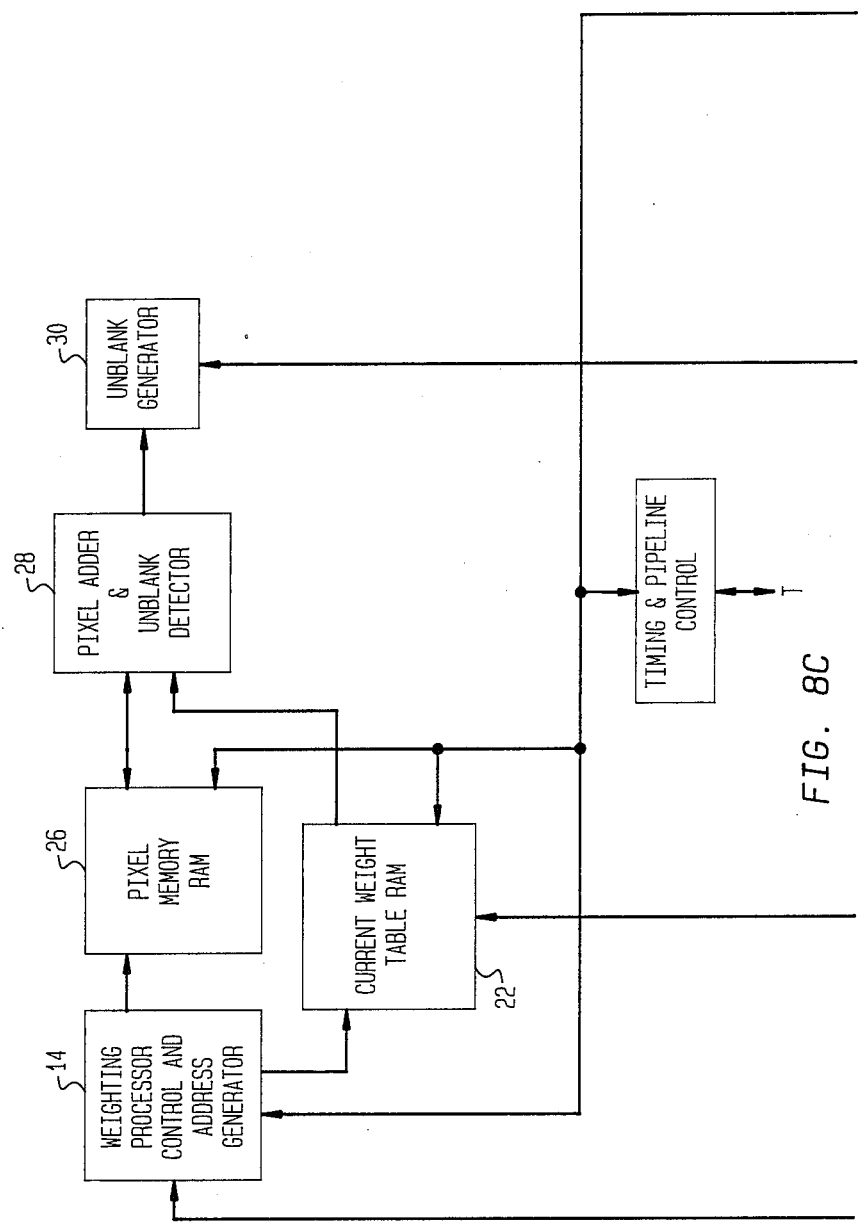

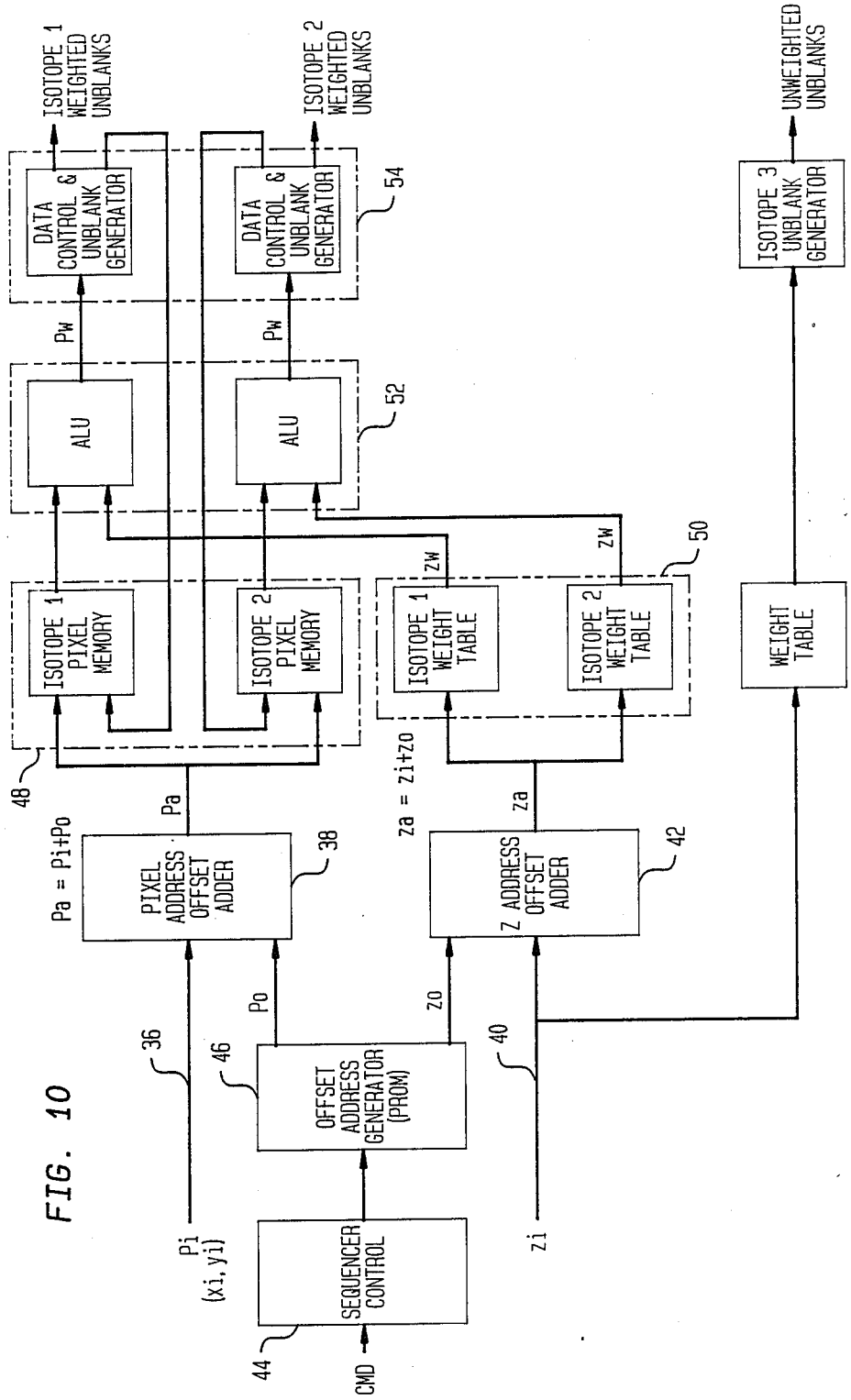

MULTIPLE PIXEL AREA-WEIGHTED ACQUISITION SYSTEM FOR SCINTILLATION CAMERAS

BACKGROUND OF THE INVENTION

The invention relates to imaging systems, and more particulary relates to scintillation camera imaging systems.

In a conventional scintillation gamma camera, scintillation event from gamma radiation are individually associated with individual pixels in the image. For example, in a conventional scintillation camera, a particular scintillation event may be detected by location (x, y). The energy of this scintillation event is then measured. When the energy of the scintillation event is quite different from the energy of a gamma ray, the event itself is considered to have a relatively low probability of contributing useful information to the final image and the event is therefore ignored. On the other hand, when the event energy is quite similar to the energy of a gamma ray, it has a relatively high probability of contributing useful information to the finished image and a single count is then associated with location (x, y). The image produced by the scintillation camera is derived from image data which associates a particular number of counts with each pixel in the finished image.

This conventional scintillation camera has the theoretical drawback that the detected location of a scintillation event is influenced by random scatter. The use of energy window-type qualification criteria for the detected scintillation event does not take proper account of the information content inherent in the energy of such events. This is because all events whose energies fall within the energy window are assumed to have equal probabilities of contributing useful information to the final image. This is not so. Two different scintillation events whose energies are dissimilar but are still within the energy window may contain substantially different amounts of useful information.

Furthermore, the attribution of an event to one pixel alone is statistically inaccurate. It is more accurate to attribute an observed scintillation event to a plurality of pixels with individual pixel weights distributed in accordance with the laws of probability.

It has been proposed to assign a weight to a detected scintillation event in accordance with the energy of that event, rather than (a) qualifying and disqualifying events based upon their falling within or outside a predefined energy window, and (b) counting all qualified events identically. This is called weighted acquisition. However, it has not until recently been possible to implement this technique in a conventional scintillation camera. This is because the precision of the energy signal has been too poor for reliable results.

One object of the invention is to provide a device for implementing area-weighted acquisition in an imaging system.

Another object is to provide such a device which takes more accurate account of the energy of a detected scintillation event than do conventional scintillation cameras which qualify events using an energy window.

Still aonther object is to provide such a device which attributes scintillation events to a plurality of pixels in accordance with the laws of probability, i.e. which implements multiple-pixel area-weighted acquisition.

A further object is to provide such a device which is easily programmable to be utilizable with a variety of radioisotope/collimator combinations.

Another object is to provide such a device which can be used to retrofit a conventional scintillation camera (provided that the camera has a suitable energy precision) to implement area-weighted acquisition in a convenient manner which still permits the camera to operate in a conventional non-weighted acquisition mode if desired.

Still a further object is, in general, to improve on the prior art.

SUMMARY OF THE INVENTION

In accordance with the invention, upon detection of a scintillation event at an event pixel, associated pixels—pixels which are to be affected by detection of an event at a particular event pixel—are identified. Means are provided to assign weights to the event pixel and to each of its associated pixels, the weights being chosen to implement the particular area-weighting system desired. The current sum of all weights which have been previously assigned to each pixel is stored in association with that pixel. Image data, such as unblank signals, are generated based upon a current sum of previously assigned weights and the current sum is then updated in accordance with the image data which have been generated.

The basic information utilized in accordance with the invention may be generated by a conventional Anger-type detection head, which identifies for each detected scintillation event an event pixel and an event energy. However, this information is used in an entirely different manner. When an event is detected, it is probabilistically attributed to a plurality of pixels over an area, in weights which correspond to the weighted acquisition scheme to be implemented, rather than being attributed to one pixel alone. In this way, a detected scintillation event is made to affect a pattern of pixels, which pattern is roughly centered upon the pixel at which the event is located.

After a particular exposure has assigned enough weight to a particular pixel, the cumulative weight assigned to that pixel is converted into image data, such as an appropriate number of unblank signals. After this conversion has taken place, the cumulative weight is updated in accordance with the image data generated, with any residuum remaining for subsequent addition to any other weights that are later assigned to that pixel.

In the preferred embodiment, the current cumulative weight stored in association with each pixel is expressable as an integral component and a fractional component, and the image data generated equals the integral component when the integral component is positive. This integral component is then subtracted from the current sum, leaving the fractional component available for future use. Preferably, the image data are unblank signals and are not generated from the current sum associated with each pixel until an event is detected at that pixel. This preferred structure makes it unnecessary to provide separate circuitry for reading out information associated wtih all the pixels in the image.

In the preferred embodiment, a filter function determined by the combination of the radioisotope and the collimator used is stored in the apparatus. This is used to assign the appropriate weight to a detected scintillation event in accordance with the energy of the detected event.

Thus, in the preferred embodiment, each scintillation is weighted in two independent senses. In the first, the total effect of the event is weighted, i.e. the event itself is treated in such a manner that its total effect upon the image is adjusted to correspond to its likely information content. In the second, the spatial effect of the event is weighted, i.e. the total effect of the event is distributed among a plurality of pixels in accordance with the likelihood that it took place at each pixel concerned (and also in accordance with other considerations such as scatter amplitude, noise injection and energy precision).

Advantageously, the apparatus is adapted for use with two isotopes simultaneously. A disconnectable, nonvolatile storage medium, such as a plug-in ROM, is used to store the filter functions for the radioisotope/collimator combinations so that the apparatus can be updated.

BRIEF DESCRIPTION OF THE DRAWINGS

Exemplary and non-limited preferred embodiments of the invention are shown in the drawings, in which:

FIG. 2 shows the effects of scatter;

FIGS. 4 and 5 show the pattern an example of the area-weighting in the preferred embodiment;

FIG. 8, 8A, 8B and 8C show a schematic block diagram of the preferred embodiment;

FIG. 10 is a detailed block diagram of a portion of the preferred embodiment.

DETAILED DESCRIPTION OF PREFERRED EMBODIMENTS

The results of the preferred embodiment will first be explained immediately below; the circuitry by which the results are achieved will be discussed next.

Figure 1:
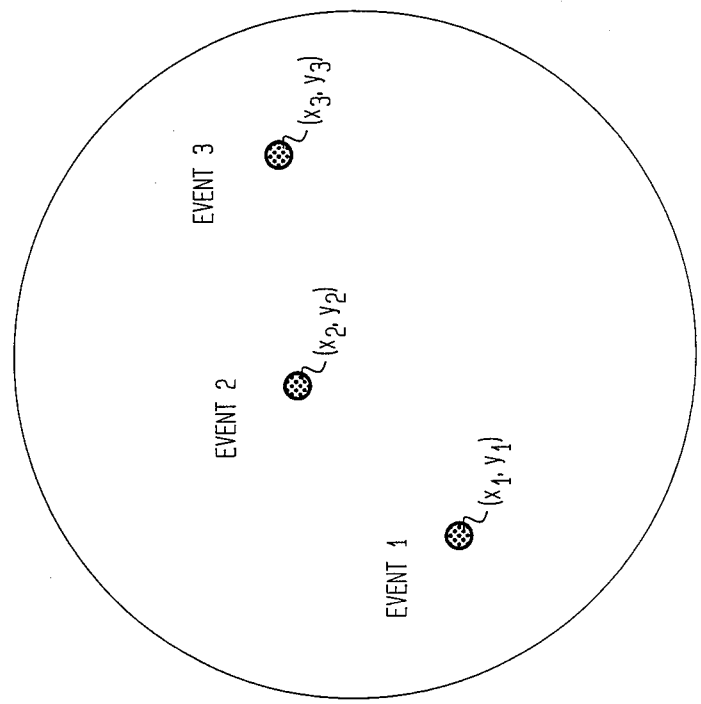
FIG. 1 shows how detected scintillation events are counted in prior art scintillation cameras.

Turning first to FIG. 1, there are shown three events: event 1, located at coordinates $(x_1, y_1)$; event 2, located at $(x_2, y_2)$ and event 3, located at $(x_3, y_3)$. In a conventional scintillation camera, each of these three events would be counted as one count and associated with only one individual pixel.

However, it is known that the detected location of event 1 at coordinates $(x_1, y_1)$ is affected by scatter. It is most accurate to say that an event detected at a particular location has a certain probability of being at that location but may actually be located somewhere else. This is illustrated in FIG. 2.

In the preferred embodiment, a detection of a scintillation event at a particular pixel (denoted the event pixel) affects not only the event pixel but an additional surrounding area that includes a pattern of twenty others (associated pixels). It is not necessary that twenty associated pixels be used; this has been chosen to operate with the pixel density used in conventional scintillation cameras manufactured by Siemens Gammasonics, Inc., but more or fewer pixels could be used.

Figure 3:
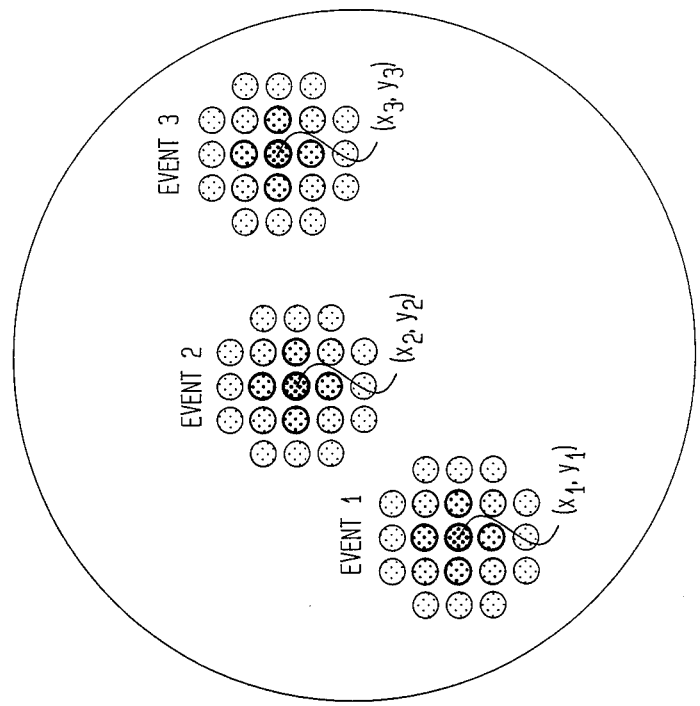
FIG. 3 shows how the events of FIG. 1 are area-weighted in the preferred embodiment.

As is shown in FIG. 3, the preferred embodiment utilizes twenty associated pixels for each event pixel. The area covered by the pattern formed by each event pixel and its surrounding associated pixels is roughly circular and centered on the event pixel. The pattern and relative weights accorded the event pixel and the associated pixels are shown in more detail in FIGS. 4 and 5.

In the preferred embodiment, a detected scintillation event is attributed to four classes of pixels; classes A, B, C and D. At the center of the pattern is the event pixel A, which receives a weight of 1.4 counts when a full energy scintillation event is detected at its location. Class B associated pixels, of which in this example there are four, receive 0.2 counts each upon the detection of a full energy scintillation event at the event pixel. Class C associated pixels, of which in this example there are four, are assigned weights of 0.15 counts upon detection of a full energy scintillation event at the event pixel. Class D associated pixels, of which in this example there are twelve, each receive $-0.1$ counts upon detection of a full energy scintillation event at the event pixel. It will be understood that there may be more or fewer classes of associated pixels and that the pattern of the classes may be different. (The numerical subscripts indicate the order in which the image data associated with the pixels are updated to reflect the effect of a scintillation event; event pixel $A_1$ is updated first, associated pixel $B_2$ next, pixel $B_3$ third, and so on).

Thus, as in the prior art, when three full energy scintillation counts have been registered, the total weight assigned to all of the affected pixels is three, with one count being allocated to each event. However, these three counts are now distributed over more pixels. It will be understood that the foregoing explanation applies in the center domain of the camera. Where the event pixel is located at the edge domain, there are an insufficient number of neighboring pixels to complete the desired pattern. In this instance, the attribution to the nonexistent pixels does not take place.

Figure 6:
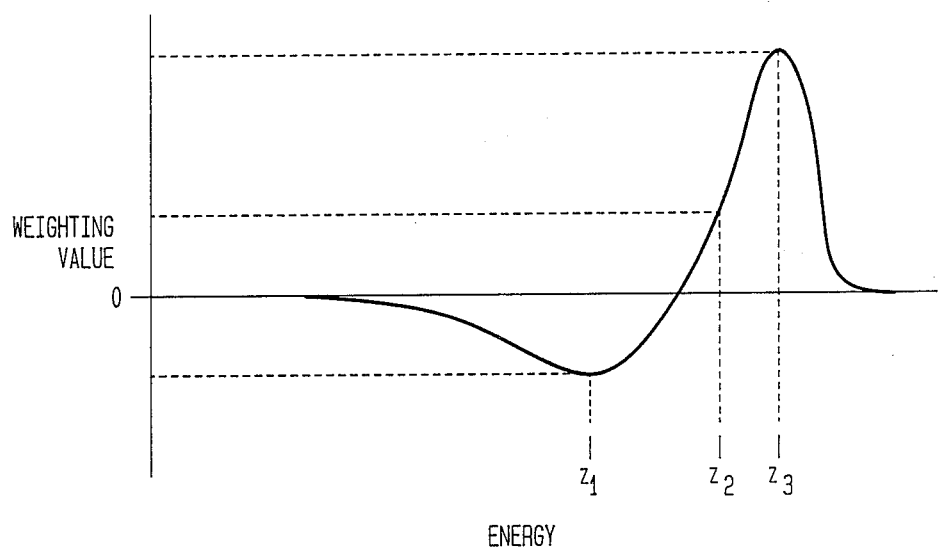
FIG. 6 shows (not to scale) a weigting filter for a particular radioisotope/collimator combination.

Referring to FIG. 6, it is known that the information content of a scintillation event depends upon the energy of the event. It is therefore desirable to weight scintillation events in accordance with their energies. The way in which this is done in the preferred embodiment will now be described.

Figure 7:
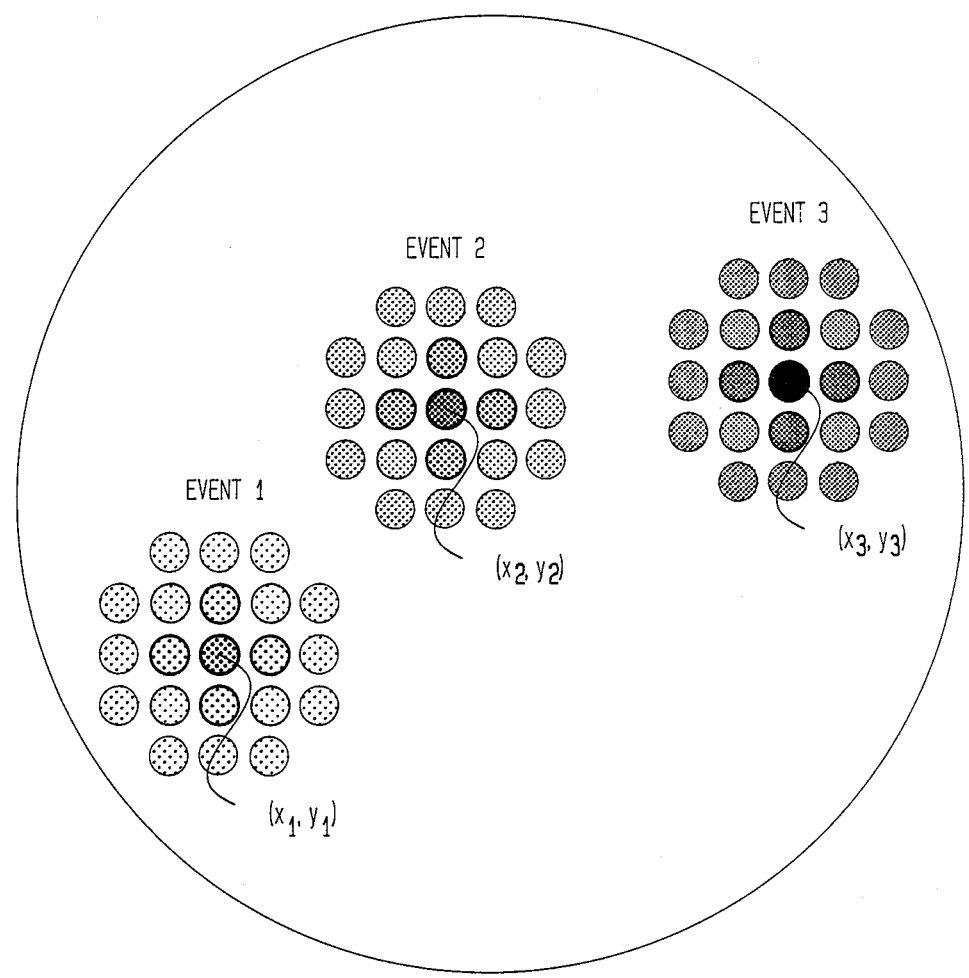
FIG. 7 shows how the FIG. 3 weighting is affected by the filter of FIG. 6.

The preferred embodiment is so constructed that a predefined set of collimators and radioisotopes is presupposed. For each combination, a filter function such as that in FIG. 6 is determined and stored in the machine. A user then "tells" the machine which combination of isotopes/collimator is in use, and the appropriate function is used to weight the detected scintillation events. The results are illustrated in FIG. 7.

The manner in which these results are carried out will now be described with reference to FIG. 8.

Figure 8B:
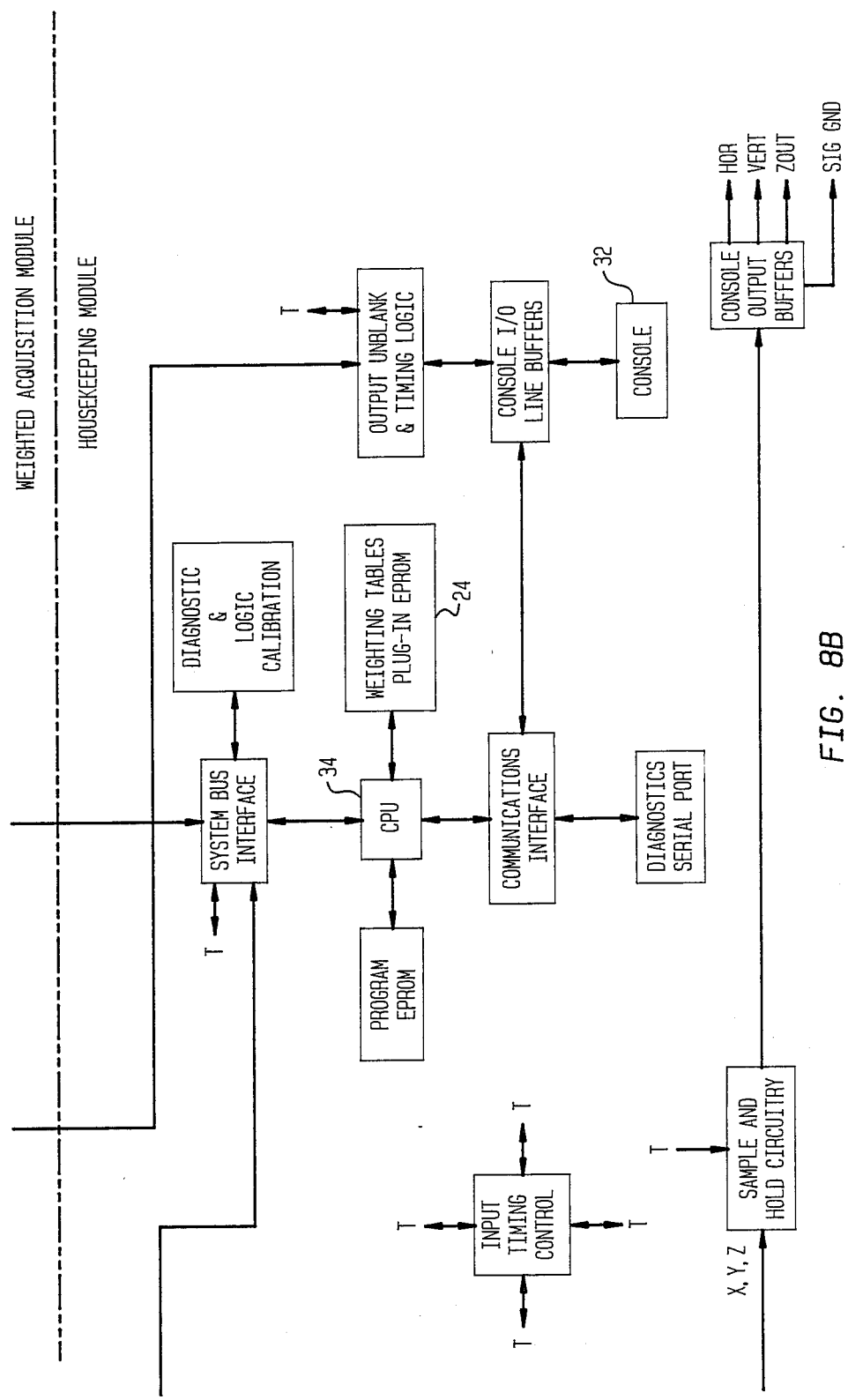

Referring to FIG. 8, information about detected scintillation events is generated by a detector head (not shown) and is routed along incoming lines 2. The information includes the horizontal and vertical (i.e. x and y) locations of detected scintillation events and also includes the energy (z) of each event so detected. This information is directed to circuit 4. The circuit 4 is an input buffer system including sample and hold circuits which maintain a particular set of information in an unvarying state until the information can be processed.

The circuit 4 is connected to A/D converters 6, 8 and 10. The converter 6 digitizes the x information about a detected scintillation event, the converter 8 digitizes the y information about the event, and the detector 10 digitizes the z information (i.e. the energy) of the detected event.

The positional information about the detected scintillation event, i.e. the digitized output of the converters 6 and 8, is multiplexed in a multiplexer 12 and routed to a weighting processor control and address generator 14 which identifies for each event pixel all its associated pixels and which is described below. The digitized energy data at the output of the converter 10 is routed to a multiplexer 16 which multiplexes the data for more convenient processing later. The multiplexer data at the output of multiplexer 16 is then passed to an energy correction RAM 18 in which is stored a look-up table to correct the data at the output of the multiplexer 16. In this preferred embodiment, the RAM 18 contains energy correction information which compensates for the particular characteristics of the detector crystal used in the detector head (both not shown). However, the RAM 18 is not necessary and may be omitted. The output of the RAM 18 is then multiplexed once again in a multiplexer 20 and routed to a current weight table RAM 22.

It will be understood that the particular manipulation of the data coming into the system on the lines 2 is not necessary for the practice of the invention; the circuitry between the lines 2 and the circuits 14 and 22 is not part of the invention.

In the preferred embodiment of the invention, the filter functions for the various radioisotope/collimator combinations are stored in an EPROM 24, which here is a plug-in ROM. A plug-in ROM is preferred because it is anticipated that the apparatus will be updated as the weighting functions for more radioisotopes/collimator combinations are determined and a plug-in ROM makes the updating easier.

In the preferred embodiment, the information from the multiplexers 12 and 20 and the EPROM 24 is utilized by the circuit 14, the current weight table RAM 22 and the pixel memory RAM 26 to assign appropriate weights to each detected scintillation event in accordance with the energy of that event, to determine the event pixel and the associated pixels which correspond to it, and to then add to the appropriate pixels a weight which appropriately reflects the particular area-weighted acquisition system to be implemented.

Figure 9:
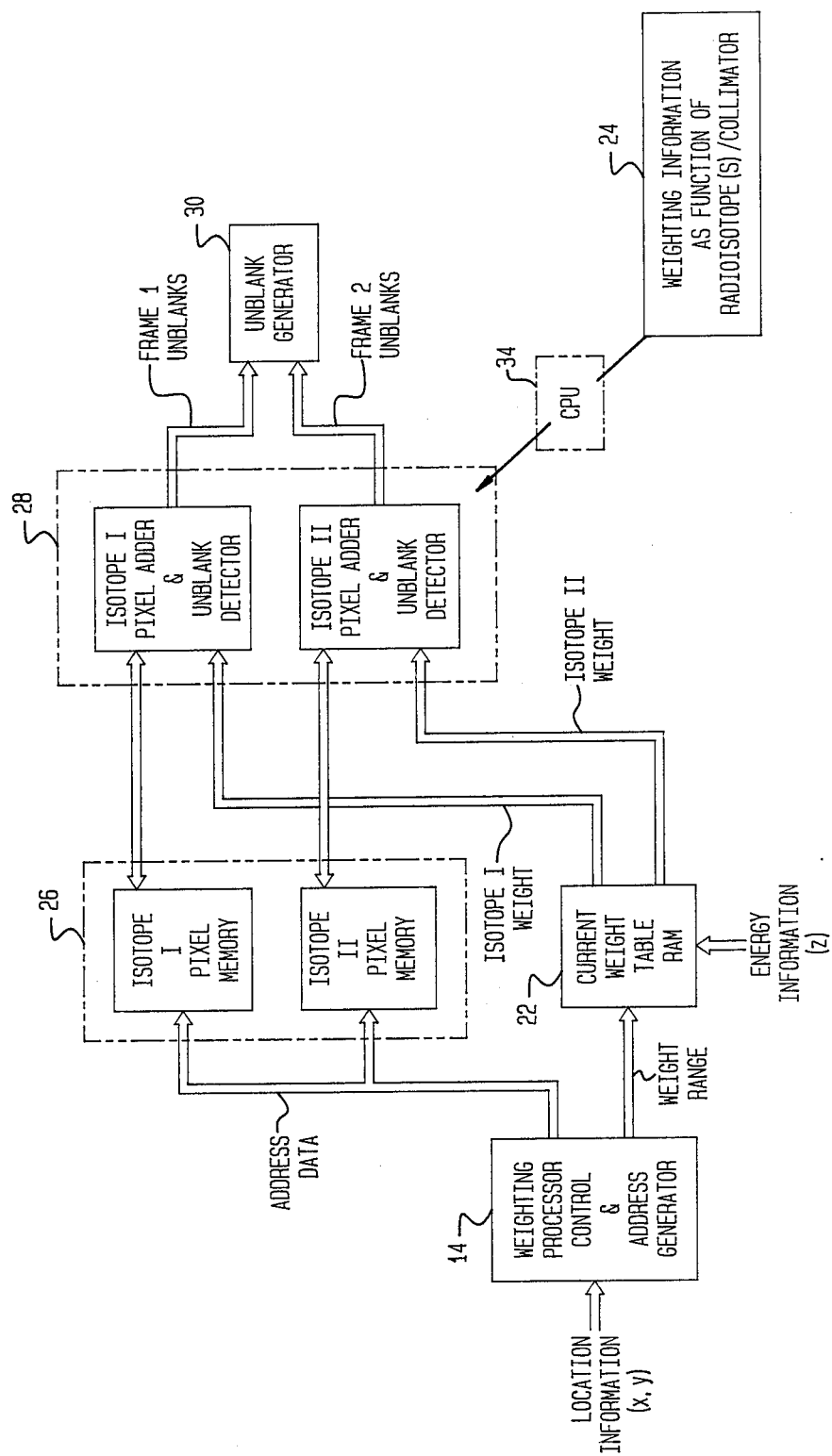
FIG. 9 is a sketch illustrating data flow in the preferred embodiment.

This is preferably carried out in the following manner, with reference to FIGS. 8 and 9. First, the operator selects at the console 32 the particular radioisotope/collimator combinations to be used; the corresponding filter functions are read out of the EPROM 24 by the CPU 34 and read into the current weight table RAM 22, where it is stored as a look-up table. Next, the detector head is brought on-line, and location and energy information about detected scintillation events begins to enter the system along lines 2. The location information is routed to the circuit 14, and the energy information is routed to the RAM 22.

In general terms, the effect of the event is then distributed to all of the pixels affected, including the event pixel (which is treated specially, see below). The pixel adder and unblank detector circuit 28 fetches information from the pixel memory RAM 26, adds the information from the current weight table RAM 22, and stores the sum in the pixel memory RAM 26. This continues until the pixel memory RAM 26 has been updated for each of the pixels.

To form an image, the contents of the pixel memory RAM 26 are transferred to the console 32 of the scintillation camera. In the preferred embodiment, this transfer takes place for only one pixel per event. This pixel is the event pixel.

In principle, the contents of the pixel memory RAM 26 can be regarded as an integral component and a fractional component for each pixel stored. When the event pixel in the pixel memory RAM 26 has an integral component which is one or more, then a number of unblank signals which correspond to that integral component are calculated by the circuit 28, generated by generator 30 and counted by the image reconstruction computer (not shown) in the console 32. The pixel memory RAM 26 is then decremented in accordance with the number of unblank signals generated, with the remaining fractional component being available for a later incrementation caused by the detection of appropriately located scintillation events. It will be understood that while unblank signals are generated in this case, this need not be so. Unblank signals are used because this is the type of image data which is readily processed using existing video technology, but it is not required that unblank signals be generated and other image data may be generated instead. Also, it will be understood that because the image data generated are unblank signals, only positive integral components are forwarded out of the pixel memory RAM 26. The pixel memory RAM 26 is then decremented. It would alternatively be possible to forward negative integral components and to increment the RAM 26 if appropriate video technology were used.

Figure 11A:
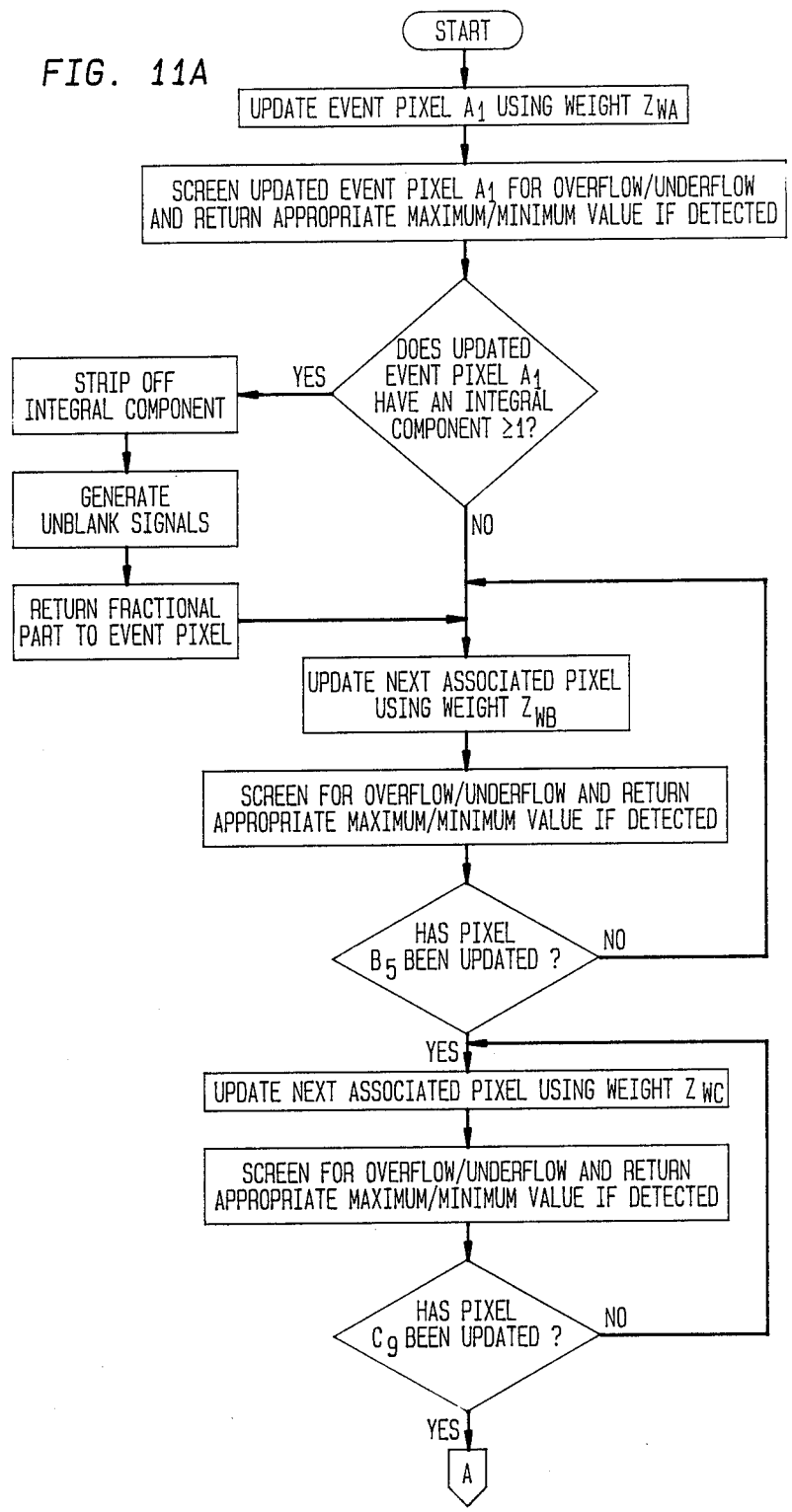
FIG. 11A-11B a flowchart of the operation of the circuitry shown in FIG. 10.
Figure 11B:
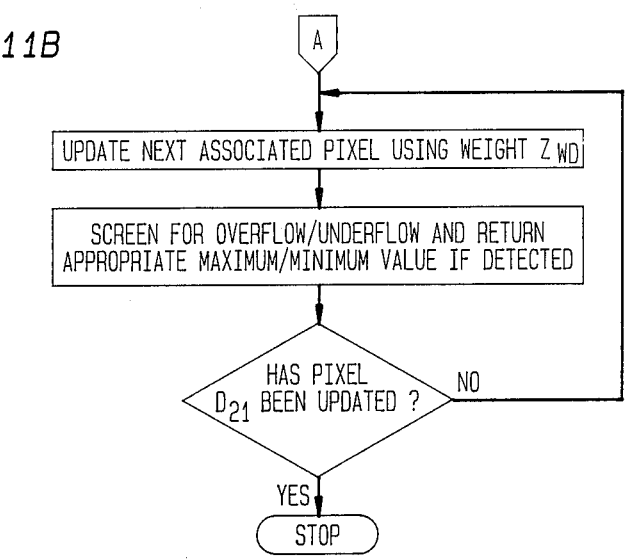

The manner in which the effect of the event is actually distributed to the appropriate pixels will now be described with specific reference to FIGS. 10 and 11. In FIG. 10, the circuitry shown is distributed between the circuit 14, the RAM 22, the pixel memory RAM 26, the circuit 28, and the generator 30. For clarity, circuitry associated with the CPU 34 and other necessary logic have been omitted.

Upon the detection of a scintillation event, the event location is presented along a data path 36 to a pixel address offset adder 38. The energy of the scintillation event is directed along data path 40 to a z address offset adder 42. Upon the receipt of a command CMD, the sequencer control 44 begins the process of distributing the effect of the scintillation event to the appropriate pixels, which process in this instance includes 21 cycles.

In each cycle, the adders 38 and 42 receive information from the offset address generator 46. The offset address generator 46 is a preprogrammed number source which identifies all the associated pixels that are associated with a particular event pixel and which also selects the appropriate weighting factor to be used for each pixel so identified. In the first of the 21 steps carried out by the sequencer control 44, the pixel address generated by the offset address generator 46 is zero because the first pixel to be updated is the event pixel $A_1$. Thus, the location of the scintillation event is routed to the pixel memory 48. At the same time, the adder 42 points to the appropriate section of the weight table 50. The weighted energy at the output of the weight table 50 is then presented to the arithmetic logic unit 52 to produce a current sum associated with the event pixel $A_1$. The current sum is then presented to the data control and unblank generator unit 54. This screens the current sum for overflow and underflow and returns the appropriate maximum or minimum value if this is detected. It also strips off any positive integral component and sends an appropriate number of unblank signals to the remaining circuitry for use in constructing an image. Any fractional component is returned to the pixel memory 48 for use later on.

In the next four steps executed by the sequencer control 44, the adder 42 points to the appropriate weight for B-type associated pixels and the adder 38 identifies where these B-type associated pixels are located. For each of these B-type associated pixels, the current sum produced by the arithmetic logic unit 52 is presented to the data control and unblank generator 54. In this case, as well as in the cases of all other associated pixels which are affected during this cycle, no unblank signals are generated. Rather, the data control and unblank generator 54 screens for overflow or underflow. If an overflow or underflow is detected, the appropriate maximum or minimum value is returned to the pixel memory 48 for use later on; if neither is detected, the actual current sum is returned to the pixel memory 48 for subsequent use.

In the next four cycles, the previous steps are repeated, this time for C-type pixels using an appropriate weight for C-type pixels. In the next twelve steps, the D type associated pixels are updated in the same way (using an appropriate weight). In the last step of the cycle, the sequence is terminated and the sequencer control 44 awaits the next command. For event pixels which are not located in the center domain of the camera, there will not be 21 cycles carried out by the sequencer control 44 because less than 21 pixels are affected by the detection of a scintillation event.

Although the description has proceeded as if only one isotope were in use at a time, the preferred embodiment is adapted for use in dual isotope mode, wherein simultaneous frames are acquired for the two isotopes in use. This is known to those skilled in the art and is not a part of the invention. Accordingly, each of the memory 48, table 50, unit 42 and generator 54 is actually divided into two parts to permit two isotopes to be imaged simultaneously.

In the preferred embodiment, there are provided a weighted acquisition module and a housekeeping module. The weighted acquisition module includes the circuit 14, the RAM 22, the pixel memory 26, the circuit 28, the generator 30, together with some ancillary interface circuitry. The remaining circuitry is located in the housekeeping module.

This arrangement is not required, but is preferred because only one module—the housekeeping module—need be replaced when the detector head is redesigned.

Those skilled in the art will understand that changes can be made in the preferred embodiments here described, and that these embodiments can be used for other purposes. Such changes and uses are within the scope of the invention, which is limited only by the claims which follow.

What is claimed is:

1. A device for converting information from a radiation detector into a useful form for implementing area-weighted acquisition in an imaging system which constructs an image from a multiplicity of image pixels, comprising:
   (a) means for identifying associated pixels which are to be affected by detection of an event at a particular event pixel;
   (b) means for assigning to the event pixel and to each of its associated pixels a weight, which weight represents an effect which the scintillation event should have thereupon to implement a particular desired area-weighted acquisition system;
   (c) means for storing in association with each pixel a current sum of all weights which have been previously assigned thereto;
   (d) means for generating image data based upon a current sum in said storing means; and
   (e) means for updating said current sum in accordance with the image data generated by said generating means.

2. The device of claim 1, wherein said current sum is expressable as an integral component and a fractional component and said generating means generates a number of unblank signals which is equal to said integral component when said integral component is at least equal to one.

3. The device of claim 2, wherein said updating means subtracts from said current sum the integral component thereof.

4. The device of claim 1, wherein said generating means operates in a manner that detection of a scintillation event at a particular pixel causes generation of unblank signals based upon the current sum associated with that pixel in said storing means.

5. The device of claim 1, wherein said weight assigned by said assigning means is varied in dependence upon the event energy of the detected scintillation event.

6. The device of claim 5, wherein a filter function is stored in a disconnectable non-volatile information storage medium and read into said assigning means to accomplish said variation.

7. The device of claim 6, wherein the information storage medium is a plug-in ROM.

8. The device of claim 1, wherein within a center domain of the image, twenty associated pixels are affected by detection of an event, at a particular event pixel.

9. The device of claim 1, further including a means for correcting event energy to compensate for characteristics of a particular detector crystal.

* * * * *